United States Patent Office.

IMPROVEMENT IN COATING SHEET IRON WITH OTHER METALS.

JOHN H. WHITLING, OF PHILADELPHIA, PENNSYLVANIA, ASSIGNOR TO J. BARDSLEY AND M. HALL, OF SAME PLACE.

*Letters Patent No. 59,787, dated November 20, 1866.*

SPECIFICATION.

TO ALL WHOM IT MAY CONCERN:

Be it known that I, JOHN WHITLING, of Philadelphia, Pennsylvania, have invented an improved mode o Coating Sheet Iron with tin or other metal or alloy, and I do hereby declare the following to be a full, clear and exact description of the same:

The plate of iron to be coated is first cleansed by immersing it in a bath, prepared by mixing three gallon of commercial muriatic acid with one gallon of water. A second bath is then made by adding zinc to the firs bath of dilute muriatic acid, until effervescence ceases; the solution thus prepared is then diluted with abou one fourth its volume of water.

The plate is then dipped in the second bath, and, while wet, is immersed in a third bath of melted tin, lead or other metal or alloy, the latter adhering to the surface of the plate, and thoroughly coating the same.

I have found by practical experiments that the above described process of coating sheet-iron plates i much cheaper and can be carried on with greater rapidity than by the process heretofore employed.

I claim as my invention, and desire to secure by Letters Patent—

Coating sheet-iron plates with tin or other metal or alloy by the process substantially as herein described.

In testimony whereof I have signed my name to this specification in the presence of two subscribin; witnesses.

JOHN WHITLING.

Witnesses:
CHAS. E. FOSTER,
JOHN WHITE.